(12) United States Patent
Pham Van et al.

(10) Patent No.: US 11,277,618 B2
(45) Date of Patent: Mar. 15, 2022

(54) INCREASING DECODING THROUGHPUT OF INTRA-CODED BLOCKS

(71) Applicant: QUALCOMM Incorporated, San Diego, CA (US)

(72) Inventors: Luong Pham Van, San Diego, CA (US); Geert Van der Auwera, Del Mar, CA (US); Adarsh Krishnan Ramasubramonian, Irvine, CA (US); Vadim Seregin, San Diego, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/905,467

(22) Filed: Jun. 18, 2020

(65) Prior Publication Data
US 2020/0404283 A1 Dec. 24, 2020

Related U.S. Application Data

(60) Provisional application No. 62/864,855, filed on Jun. 21, 2019.

(51) Int. Cl.
H04N 19/136 (2014.01)
H04N 19/174 (2014.01)
H04N 19/176 (2014.01)
H04N 19/186 (2014.01)

(52) U.S. Cl.
CPC ......... H04N 19/136 (2014.11); H04N 19/174 (2014.11); H04N 19/176 (2014.11); H04N 19/186 (2014.11)

(58) Field of Classification Search
None
See application file for complete search history.

(56) References Cited

U.S. PATENT DOCUMENTS

| 2013/0251038 A1* | 9/2013 | Yokoyama | H04N 19/593 375/240.13 |
| 2017/0085917 A1* | 3/2017 | Hannuksela | H04N 19/136 |
| 2020/0296367 A1 | 9/2020 | Pham Van et al. | |

OTHER PUBLICATIONS

International Search Report and Written Opion—PCT/US2020/038616—ISA/EPO—dated Sep. 29, 2020.

(Continued)

Primary Examiner — Chikaodili E Anyikire
(74) Attorney, Agent, or Firm — Shumaker & Sieffert, P.A.

(57) ABSTRACT

A method of decoding video data includes determining, by one or more processors implemented in circuitry, a picture size of a picture. The picture size applies a picture size restriction to set a width of the picture and a height of the picture to each be a respective multiple of a maximum of 8 and a minimum coding unit size for the picture. The method further includes determining, by the one or more processors, a partition of the picture into a plurality of blocks and generating, by the one or more processors, a prediction block for a block of the plurality of blocks. The method further includes decoding, by the one or more processors, a residual block for the block and combining, by the one or more processors, the prediction block and the residual block to decode the block.

30 Claims, 10 Drawing Sheets

(56) References Cited

OTHER PUBLICATIONS

Zhao et al., "CE1-Related: Constrained Chroma Block Partitioning," 12.JVET Meeting; Oct. 3, 2018-Oct. 12, 2018; Macao (The Joint Video Exploration Team of ISO/IEC JTC1/SC29/WG11 and ITU-T SG.16) No. JVET-L0372 Sep. 30, 2018 XP030250371, retrieved from the internet: URL:http://phenix.int-evry.fr/jvet/doc_end_user/documents/12_Macao/wg11/JVET-L0372-v2.zip JVET-L0372-v2_clean.docx [retrieved on Sep. 30, 2018] the whole document (3 pp).

Choi et al., "CE1-Related: Minimum Block Size Restriction," 12.JVET Meeting; Oct. 3, 2018-Oct. 12, 2018; Macao (The Joint Video Exploration Team of ISO/IEC JTC1/SC29/WG11 and ITU-T SG.16) No. JVET-L0137 Sep. 24, 2018 XP030193667, retrieved from the internet: URL:http://phenix.int-evry.fr/jvet/doc end user/documents/12_Macao/wg11/JVET-L0137-v3.zip JVET-L0137.docx [retrieved on Sep. 24, 2018] the whole document (6 pp).

Rosewarne et al., "CE1-Related: Chroma Block Coding and Size Restriction," 12.JVE I Meeting; Oct. 3, 2018-Oct. 12, 2018; Macao (The Joint Video Exploration Team of ISO/IEC JTC1/SC29/WG11 and ITU-T SG.16) No. JVET-L0129 Oct. 6, 2018 XP030251347, retrieved from the internet: URL:http://phenix.int-evry.fr/jvet/doc_end_user/documents/12_Macao/wg11/JVET-L0129-v2.zip JVET-L0129_r1 docx [retrieved on Oct. 6, 2018] section 2 (4 pp).

Bross B., et al., "Versatile Video Coding (Draft 3)", JVET-L1001-V1, Joint Video Experts Team (JVET) of ITU-T SG 16 WP 3 and ISO/IEC JTC 1/SC 29/WG 11, 12th Meeting: Macao, CN, Oct. 3-12, 2018, 165 Pages.

Bross B., et al., "Versatile Video Coding (Draft 8)", Joint Video Experts Team (JVET) of ITU-T SG 16 WP 3 and ISO/IEC JTC 1/SC 29/WG 11,17th Meeting: Brussels, BE, Jan. 7-17, 2020, Document: JVET-Q2001-vA, 519 Pages.

Bross et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-v8, 399 Pages, XP030212626, Retrieved from the Internet: URL: http://phenix.int-evry.fr/mpeg/doc_end_user/documents/126_Geneva/wg11/m48053JVET-N1001-v8-JVET-N1001-v8.zip. JVET-N1001-v8.docx. [retrieved on Jun. 11, 2019].

Chen J., et al., "Algorithm Description for Versatile Video Coding and Test Model 4 (VTM 4)", 125. MPEG Meeting, Jan. 14, 2019-Jan. 18, 2019; Marrakech (Motion Picture Expert Group or ISO/IEC JTC1/SC29/WG11), No. m46628, Feb. 16, 2019 (Feb. 16, 2019), XP030215566, 60 pages, Retrieved from the Internet: URL: http://phenix.int-evry.fr/mpeg/doc_end_user/documents/125_Manrakech/wg11/m46628-JVET-M1002-v1-JVET-M1002-v1.zip. JVET-M1002-v1.docx. [retrieved on Feb. 16, 2019].

Chen J., et al., "Algorithm description for Versatile Video Coding and Test Model 2 (VTM 2)", Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.

Chen J., et al., "Algorithm Description for Versatile Video Coding and Test Model 3 (VTM 3)," 12, JVET Meeting, Oct. 3, 2018-Oct. 12, 2018, MACAO, (The Joint Video Exploration Team of ISO/IEC JTC1/SC29/WG11 and ITU-T SG.16), No. JVET-L1002-v1, Dec. 24, 2018 (Dec. 24, 2018), XP030200768, Retrieved from the Internet: URL: http://phenix.int-evry.fr/jvet/doc_end_user/documents/12_Macao/wg11/JVET-L1002-v2.zip JVET-L1002.docx [retrieved on Dec. 24, 2018] 48 pages.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Lin Z., et al., "CE3-related: Shared Reference Samples for Multiple Chroma Intra CBs", Joint Video Experts Team (JVET) of ITU-T SG 16 WP 3 and ISO/IEC JTC 1/SC 29/WG 11, Doc: JVET-M0169-V1, 13th Meeting: Marrakesh, MA, Jan. 9-18, 2019, JVET-M0169-v1, pp. 1-4.

Lin, Z-Y., et al., "CE3-2.1.1 and CE3-2.1.2: Removing 2x2, 2x4, and 4x2 Chroma CBs", JVET-O0050-v2, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5.

Van L., et al., "CE3-2.2: Enabling Parallel Reconstruction of Small intra-coded Chroma Blocks", JVET-O0118, Joint Video Experts Team (JVET) of ITU-T SG 16 WP 3 and ISO/IEC JTC 1/SC 29/WG 11, 15th Meeting: Gothenburg, SE, Jul. 3-12, 2019, Doc: JVET-O0118-v2, pp. 1-3.

Van, L.P., et al., "CE3-related: On 2x2/2x4/4x2 Chroma Blocks at the Corner of Pictures", JVET-O0640-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-2.

Yao J., et al., "Non-CE3: Intra Prediction Information Coding", JVET-M0210-V3, Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0210-r2, pp. 1-7.

Zhou T., et al., "Non-CE3: Intra Chroma Partitioning and Prediction Restriction", Joint Video Experts Team (JVET) of ITU-T SG 16 WP 3 and ISO/IEC JTC 1/SC 29/WG 11, Doc: JVET-M0065, 13th Meeting: Marrakesh, MA, Jan. 9-18, 2019, JVET-M0065, pp. 1-4.

* cited by examiner

INCREASING DECODING THROUGHPUT OF INTRA-CODED BLOCKS

This application claims the benefit of U.S. Provisional Application No. 62/864,855, filed Jun. 21, 2019, which is incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for processing blocks of video data (e.g., small intra-coded blocks). A video encoder may be configured to partition video data into a plurality of blocks. For example, rather than processing a large block of 64×64 samples (e.g., pixels), the video encoder may split a block into two or more smaller blocks, such as, for example, four 32×32 blocks, sixteen 16×16 blocks, or other block sizes. In some examples, the video encoder may be configured to split blocks into relatively small sizes (e.g., 2×2 blocks, 2×4 blocks, 4×2 blocks, etc.). Similarly, a video decoder may be configured to determine a partition of the video data into the plurality of blocks.

In accordance with example techniques of the disclosure, a video coder (e.g., a video encoder or a video decoder) may determine a picture size that applies a picture size restriction to reduce or eliminate small chroma blocks (e.g., a 2×2 chroma block, a 2×4 chroma block, a 4×2 chroma block) at a bottom-right corner of a picture. That is, during a partitioning of picture of video data that splits large blocks of video data into smaller blocks, the picture size restriction may prevent one or more splits that would lead to a relatively small block size at a corner of the picture (e.g., a video picture, a slice of a video picture, or other video data). For example, a video encoder may restrict a picture size of the video data. In some examples, a video decoder may determine a picture size that applies the picture size restriction. After partitioning the picture, the video coder may determine a prediction block for a block of the picture. A prediction block may be dependent on neighboring blocks. For example, the video coder may determine a prediction block for the block based on a top neighboring block and a left neighboring block. By preventing splits that lead to a relatively small block size at the corner of the picture, the video coder may determine prediction blocks for blocks of a picture of video data with fewer block dependencies, thus potentially increasing a parallelism of coding (e.g., encoding or decoder) blocks of the picture with little to no loss in prediction accuracy and/or complexity.

In one example, a method of decoding video data includes determining, by one or more processors implemented in circuitry, a picture size of a picture, wherein the picture size applies a picture size restriction to set a width of the picture and a height of the picture to each be a respective multiple of a maximum of 8 and a minimum coding unit size for the picture; determining, by the one or more processors, a partition of the picture into a plurality of blocks; generating, by the one or more processors, a prediction block for a block of the plurality of blocks; decoding, by the one or more processors, a residual block for the block; and combining, by the one or more processors, the prediction block and the residual block to decode the block.

In another example, a method of encoding video data includes: setting, by one or more processors implemented in circuitry, a picture size of a picture, wherein setting the picture size comprises applying a picture size restriction to set a width of the picture and a height of the picture to each be a respective multiple of a maximum of 8 and a minimum coding unit size for the picture; partitioning, by one or more processors implemented in circuitry, the picture into a plurality of blocks; generating, by the one or more processors, a prediction block for a block of the plurality of blocks; generating, by the one or more processors, a residual block for the block based on differences between the block and the prediction block; and encoding, by the one or more processors, the residual block.

In one example, a device for decoding video data includes one or more processors implemented in circuitry and configured to: determine a picture size of a picture, wherein the picture size applies a picture size restriction to set a width of the picture and a height of the picture to each be a respective multiple of a maximum of 8 and a minimum coding unit size for the picture; determine a partition of the picture into a plurality of blocks; generate a prediction block for a block of the plurality of blocks; decode a residual block for the block; and combine the prediction block and the residual block to decode the block.

In another example, a device for encoding video data includes one or more processors implemented in circuitry and configured to: set a picture size of a picture, wherein, to set the picture size, the one or more processors are configured to apply a picture size restriction to set a width of the picture and a height of the picture to each be a respective multiple of a maximum of 8 and a minimum coding unit size for the picture; partition the picture into a plurality of blocks;

generate a prediction block for a block of the plurality of blocks; generate a residual block for the block based on differences between the block and the prediction block; and encode the residual block.

In one example, an apparatus for decoding video data includes: means for determining a picture size of a picture, wherein the picture size applies a picture size restriction to set a width of the picture and a height of the picture to each be a respective multiple of a maximum of 8 and a minimum coding unit size for the picture; means for determining a partition of the picture into a plurality of blocks; means for generating a prediction block for a block of the plurality of blocks; means for decoding a residual block for the block; and means for combining the prediction block and the residual block to decode the block.

In another example, an apparatus for encoding video data includes: means for setting a picture size of a picture, wherein the means for setting the picture size comprises means for applying a picture size restriction to set a width of the picture and a height of the picture to each be a respective multiple of a maximum of 8 and a minimum coding unit size for the picture; means for partitioning the picture into a plurality of blocks; means for generating a prediction block for a block of the plurality of blocks; means for generating a residual block for the block based on differences between the block and the prediction block; and means for encoding the residual block.

In one example, a computer-readable storage medium has stored thereon instructions that, when executed, cause one or more processors to: determine a picture size of a picture, wherein the picture size applies a picture size restriction to set a width of the picture and a height of the picture to each be a respective multiple of a maximum of 8 and a minimum coding unit size for the picture; determine a partition of the picture into a plurality of blocks; generate a prediction block for a block of the plurality of blocks; decode a residual block for the block; and combine the prediction block and the residual block to decode the block.

In another example, a computer-readable storage medium has stored thereon instructions that, when executed, cause one or more processors to: set a picture size of a picture, wherein, to set the picture size, the instructions cause the one or more processors to apply a picture size restriction to set a width of the picture and a height of the picture to each be a respective multiple of a maximum of 8 and a minimum coding unit size for the picture; partition the picture into a plurality of blocks; generate a prediction block for a block of the plurality of blocks; generate a residual block for the block based on differences between the block and the prediction block; and encode the residual block.

The details of one or more examples are set forth in the accompanying drawings and the description below. Other features, objects, and advantages will be apparent from the description, drawings, and claims.

DETAILED DESCRIPTION

Figure 1:
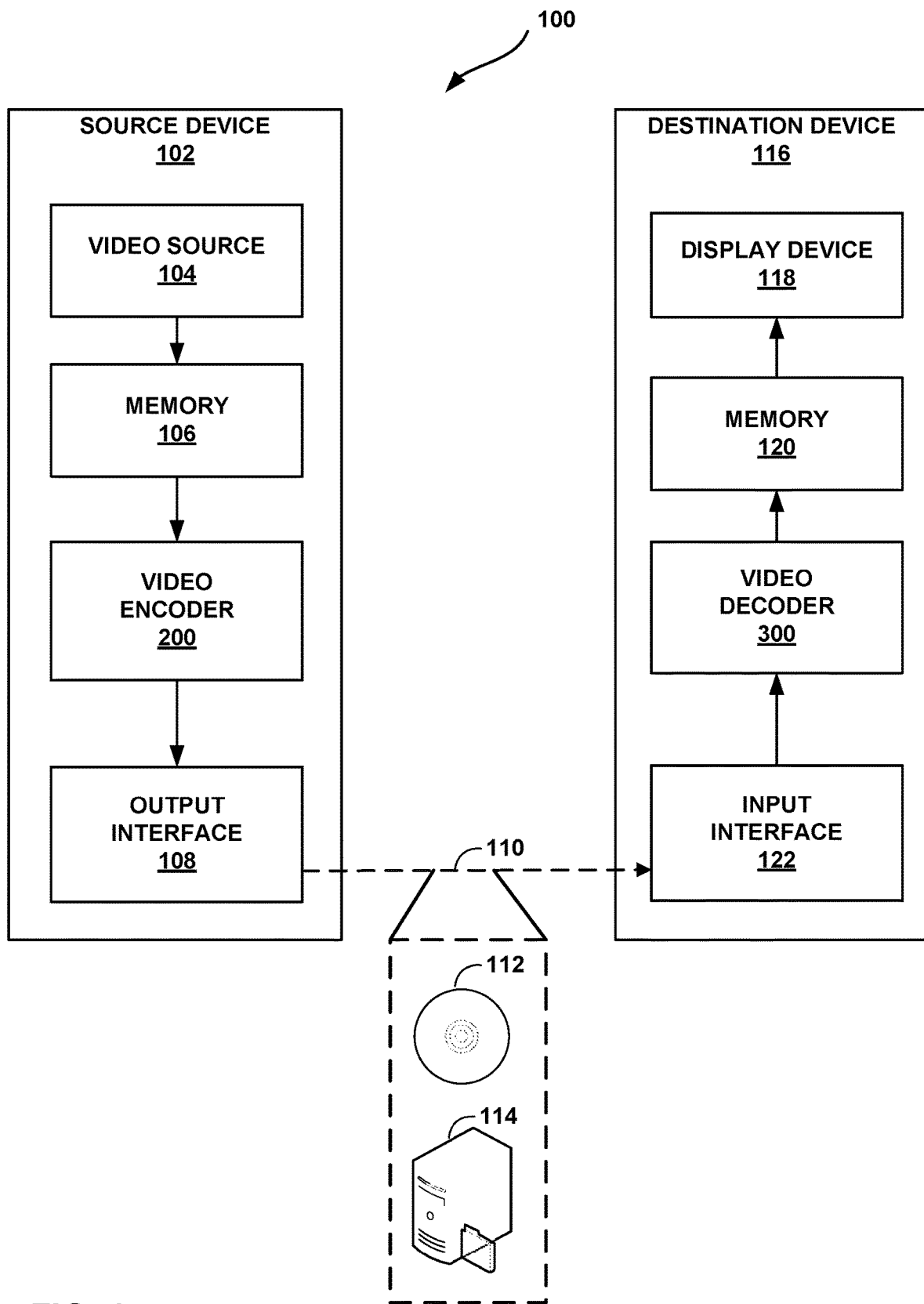
FIG. 1 is a block diagram illustrating an example video encoding and decoding system that may perform the techniques of this disclosure.

In general, this disclosure describes techniques for processing blocks of video data (e.g., intra-coded blocks). In examples of the disclosure, a video encoder may be configured to partition video data into a plurality of blocks. For example, rather than processing a large block of 64×64 samples, the video encoder may split a block into two smaller blocks, such as, for example, four 32×32 blocks, sixteen 16×16 blocks, or other block sizes. In some examples, the video encoder may be configured to split blocks into relatively small sizes (e.g., 2×2 blocks, 2×4 blocks, 4×2 blocks, etc.). For example, the video encoder may split a 16×8 block into two 8×8 blocks. Similarly, a video decoder may determine the partition of video data into the plurality of blocks.

To reduce a complexity of coding with little or no loss in coding accuracy, a video coder (e.g., a video encoder or video decoder) may be configured to represent a brightness of a block of video data using a luma component and color characteristics of the block of video data using chroma components. The chroma components may include a blue minus luma value ('Cb') and/or a red minus luma value ('Cr'). For example, a video coder (e.g., a video encoder or video decoder) may be configured to represent an 8×8 block by an 8×8 luma block (e.g., 'Y') of luma components, a first 4×4 chroma block (e.g., 'Cr') of chroma components and a second 4×4 chroma block (e.g., 'Cb') of chroma components. That is, the chroma components of a block of video data may be subsampled to have fewer samples than luma components of the block of video data. In this way, subsampling chroma components may improve a coding efficiency with little or no loss of coding accuracy.

A video coder (e.g., a video encoder or video decoder) may be configured to intra-code blocks where a prediction block is dependent on other blocks. For example, the video coder may predict a current block using a top neighboring block and a left neighboring block to improve a coding accuracy. As such, the video coder may not predict the current block in parallel with predicting the top neighboring block and a left neighboring block. Instead, the video coder may wait to predict the current block until completing a prediction of the top neighboring block and the left neighboring block. The block dependency may increase a coding complexity that increases with smaller block sizes.

In accordance with the techniques of the disclosure, a video coder (e.g., a video encoder or video decoder) may apply a picture size restriction to prevent a split that leads to relatively small block sizes. As used herein, a split may refer to a partitioning of a block into smaller blocks. For example, the video coder may be configured to apply a picture size restriction to prevent a splitting of a picture that would result in a small chroma block at a corner (e.g., a bottom-right corner) of the picture. Applying the picture restriction may help to improve a coding parallelism for coding block while having no or little impact on coding accuracy and/or complexity.

After partitioning or splitting the video data, a video coder (e.g., a video encoder or video decoder) may generate prediction information for a block of the picture and determine a prediction block for the block based on the predicted information. Again, a prediction block may be dependent on neighboring blocks in the case of intra prediction. For example, the video coder may determine a prediction block for a block based on a top neighboring block and a left neighboring block. By preventing splits that lead to relatively small block sizes, the video coder may determine the prediction information of blocks of a picture of video data with fewer block dependencies, thus potentially increasing a number of blocks that may be coded (e.g., encoded or decoded) in parallel with little to no loss in prediction accuracy and/or complexity.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for extending the chroma split restriction in shared-tree configuration, restricting a picture size, and/or processing 2×2, 2×4, or 4×2 chroma blocks at a corner of a picture. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for extending the chroma split restriction in shared-tree configuration, restricting a picture size, and processing 2×2, 2×4, or 4×2 chroma blocks at a corner of a picture. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 shown separately from video encoder 200 and video decoder 300 in this example, video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 8)," Joint Video Experts Team (WET) of ITU-T SG 16 WP 3 and ISO/IEC JTC 1/SC 29/WG 11, 17$^{th}$ Meeting: Brussels, BE, 7-17 Jan. 2020, JVET-Q2001-vA (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

To improve coding accuracy, a video coder (e.g., video encoder 200 or video decoder 300) may partition a block of data. For example, the video coder may partition a block using a quad-tree split, a binary split, or another split. A video coder (e.g., video encoder 200 or video decoder 300) may determine a single tree for video data (e.g., a slice of video data) based on luma components for the block. For example, a block may be represented by an 8×8 luma block (e.g., 'Y'), a first 4×4 chroma block (e.g., 'Cr') and a second 4×4 chroma block (e.g., 'Cb'). In this example, the video coder may generate the single tree to split the block such that the 8×8 luma block is split into two 4×4 luma blocks. The video coder may split the first 4×4 chroma block (e.g., 'Cr') into two 2×2 chroma blocks and split the second 4×4 chroma block (e.g., 'Cb') into two 2×2 chroma blocks according to the single tree. In this way, the video coder may improve accuracy of a resulting prediction block for the block, which may improve prediction accuracy of the video data.

However, when partitioning blocks of video data (e.g., intra-coded blocks), a video coder (e.g., video encoder 200 or video decoder 300) may split a block (e.g., chroma components of the block, referred to herein as a "chroma block," and/or luma components of the block, referred to herein as a "luma block") into small blocks (e.g., a 2×2 block, a 2×4 block, a 4×2 block, etc.). Moreover, each of the small blocks may have a coding dependency on neighboring blocks. For example, the video coder may determine a prediction block for each of the small blocks using samples of one or more neighboring blocks (e.g., a left neighbor block and/or a top neighbor block). As such, the small blocks along with the data dependencies may cause the video coder to sequentially determine a prediction block for each of the small blocks, which may result in lower coding parallelism.

In accordance with example techniques of the disclosure, a video encoder (e.g., video encoder 200) may be configured to set a width of a picture and a height of the picture to each be a respective multiple of a maximum of 8 and a minimum coding unit size for the picture. For example, video encoder 200 may be configured to calculate a width of a picture as $X_1*N$, where $X_1$ is a first integer multiple, N=max(8, minCuSize), and minCuSize is a minimum coding unit value. The video encoder may be configured to calculate a height of a picture as $X_2*N$, where $X_2$ is a second integer multiple. That is, if 8 is greater than the minCuSize, then the picture width is restricted to being $X_1*8$ and the picture height is restricted to being $X_2*8$. However, if minCuSize is greater than 8, then the picture width is restricted to being $X_1*$minCuSize and the picture height is restricted to being $X_2*$minCuSize. In this way, the video encoder may set the width of the picture and the height of the picture to help to ensure that a bottom-right corner block of a picture comprises a width of at least 8 samples and a height of at least 8 samples (i.e., at least an 8×8 block), which may result in a chroma block for the bottom-right corner block that comprises a size of at least 4×4 when the video encoder applies a color format that down-samples chroma blocks (e.g., 4:2:2 or 4:2:0) and of at least 8×8 when the video encoder does not apply a color format that down-samples chroma blocks.

A video decoder (e.g., video decoder 300) may be configured to determine a picture size, where the picture size applies a picture size restriction. The picture size restriction may set a width of the picture and a height of the picture to each be a respective multiple of a maximum of 8 and a minimum coding unit size for the picture. For example, the video decoder may be configured to decode one or more partitioning syntax elements indicating the picture size of the picture and a partition of the picture into a plurality of blocks. In this example, the picture size may help to ensure that the video decoder identifies a bottom-right corner block of a picture that comprises a width of at least 64 luma samples (or 16 chroma samples), which may result in a chroma block for the bottom-right corner block that comprises a size of at least 16 samples. That is, the video decoder may not decode further split flags or other partitioning syntax elements that would split the bottom-right corner block of the picture to be less than 8×8. In this way, the video decoder may determine the picture size and determine the partition of the picture to help to ensure that a bottom-right corner block of a picture comprises a width of at least 8 samples and a height of at least 8 samples (i.e., at least an 8×8 block), which may result in a chroma block for the bottom-right corner block that comprises a size of at least 4×4 when the video encoder applies a color format that down-samples chroma blocks (e.g., 4:2:2 or 4:2:0) and of at least 8×8 when the video encoder does not apply a color format that down-samples chroma blocks.

After partitioning the video data, a video coder (e.g., video encoder 200 or video decoder 300) may generate prediction information for a block and determine a prediction block for the block based on the predicted information. Again, a prediction block may be dependent on neighboring blocks. For example, the video coder may determine a prediction block for a current block based on a top neighboring block and a left neighboring block. By preventing block splits (e.g., chroma components and/or luma components) that lead to relatively small block sizes, the video coder may determine the prediction information of blocks of video data with fewer block dependencies, thus potentially increasing a number of blocks that may be coded (e.g., encoded or decoded) in parallel with little to no loss in prediction accuracy and/or complexity.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
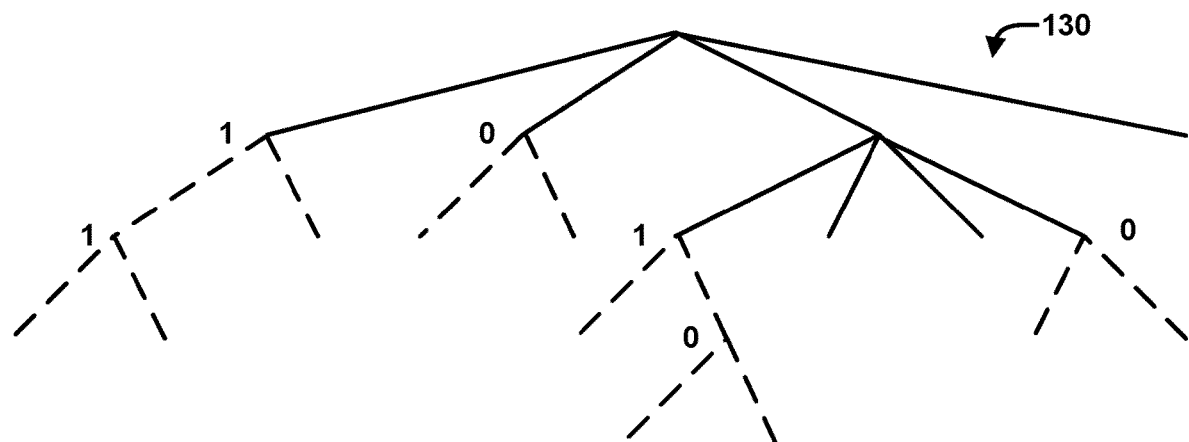
FIGS. 2A and 2B are conceptual diagrams illustrating an example quadtree binary tree (QTBT) structure, and a corresponding coding tree unit (CTU).
Figure 2B:
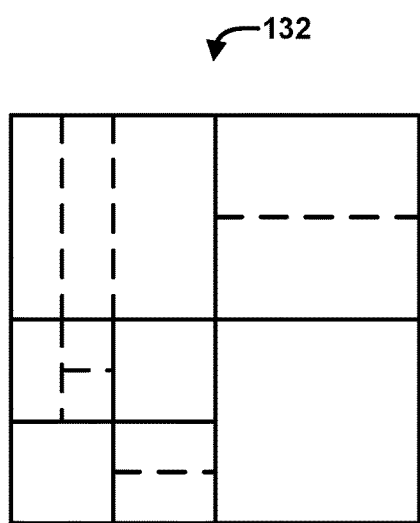

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, it will not be further split by the binary tree, since the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4a, in this example), no further splitting is permitted. When the binary tree node has width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs and are further processed according to prediction and transform without further partitioning.

Figure 3A:
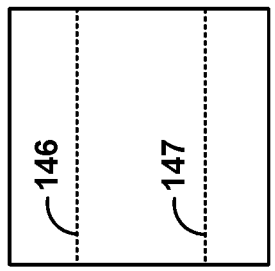
FIGS. 3A-3E are conceptual diagrams illustrating multiple example tree splitting modes.
Figure 3B:
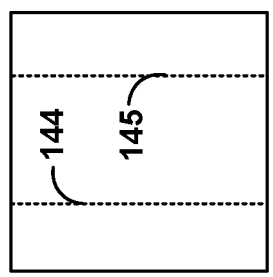
Figure 3C:
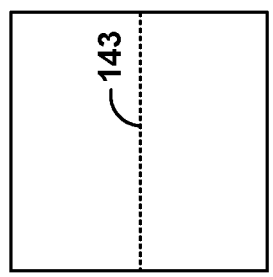
Figure 3D:
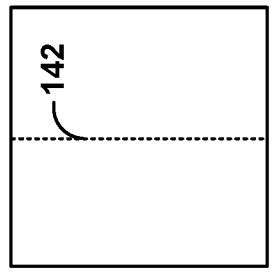
Figure 3E:
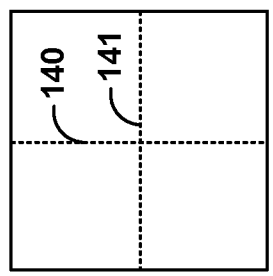

FIGS. 3A-3E are conceptual diagrams illustrating example multiple tree splitting modes. FIG. 3A illustrates quad tree portioning, FIG. 3B illustrates vertical binary tree partitioning, FIG. 3C illustrates horizontal binary tree partitioning, FIG. 3D illustrates vertical ternary tree partitioning, and FIG. 3E illustrates horizontal ternary tree partitioning.

In VVC WD5, a CTU is split into CUs by using a quaternary-tree structure denoted as coding tree to adapt to various local characteristics. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied, and the relevant information is transmitted to the decoder on a PU basis. After obtaining the residual block by applying the prediction process based on the PU splitting type, a leaf CU can be partitioned into transform units (TUs) according to another quaternary-tree structure like the coding tree for the CU. One feature of the HEVC structure is that the HEVC structure has the multiple partitioning concepts including CU, PU, and TU.

In VVC, a quadtree with nested multi-type tree using binary and ternary splits segmentation structure replaces the concepts of multiple partition unit types, i.e., VVC removes the separation of the CU, PU and TU concepts except as needed for CUs that have a size too large for the maximum transform length and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure.

FIG. 3A is a conceptual diagram illustrating an example of quad-tree partitioning including a vertical binary split 140 ("SPLIT_BT_VER") and a horizontal binary split 141 ("SPLIT_BT_HOR"). FIG. 3B is a conceptual diagram illustrating an example of vertical binary-tree partitioning including a vertical binary split 142. FIG. 3C is a conceptual diagram illustrating an example of horizontal binary-tree partitioning including a horizontal binary split 143. FIG. 3D is a conceptual diagram illustrating an example of vertical ternary-tree partitioning including vertical ternary splits 144, 145 ("SPLIT_TT_VER"). FIG. 3E is a conceptual diagram illustrating an example of horizontal ternary-tree partitioning including horizontal ternary splits 146, 147 ("SPLIT_TT_HOR").

The multi-type tree leaf nodes are called coding units (CUs), and unless the CU is too large for the maximum transform length, this segmentation is used for prediction and transform processing without any further partitioning. This means that, in some cases, the CU, PU and TU have the same block size in the quadtree with nested multi-type tree coding block structure. The exception may occur when maximum supported transform length is smaller than the width or height of the colour component of the CU.

A CTU may include a luma coding tree block (CTB) and two chroma coding tree blocks. At the CU level, a CU is associated with a luma coding block (CB) and two chroma coding blocks. As in VTM (the reference software of the VVC), the luma tree and the chroma tree are separated in intra slices (referred to as dual tree structure) while they are shared in inter slices (referred to as single tree or shared tree structure). The size of a CTU can be up to 128×128 (luma component) while the size of a coding unit may range from 4×4 to the size of CTU. In this scenario, the size of a chroma block can be 2×2, 2×4, or 4×2 in 4:2:0 color format.

Figure 4:
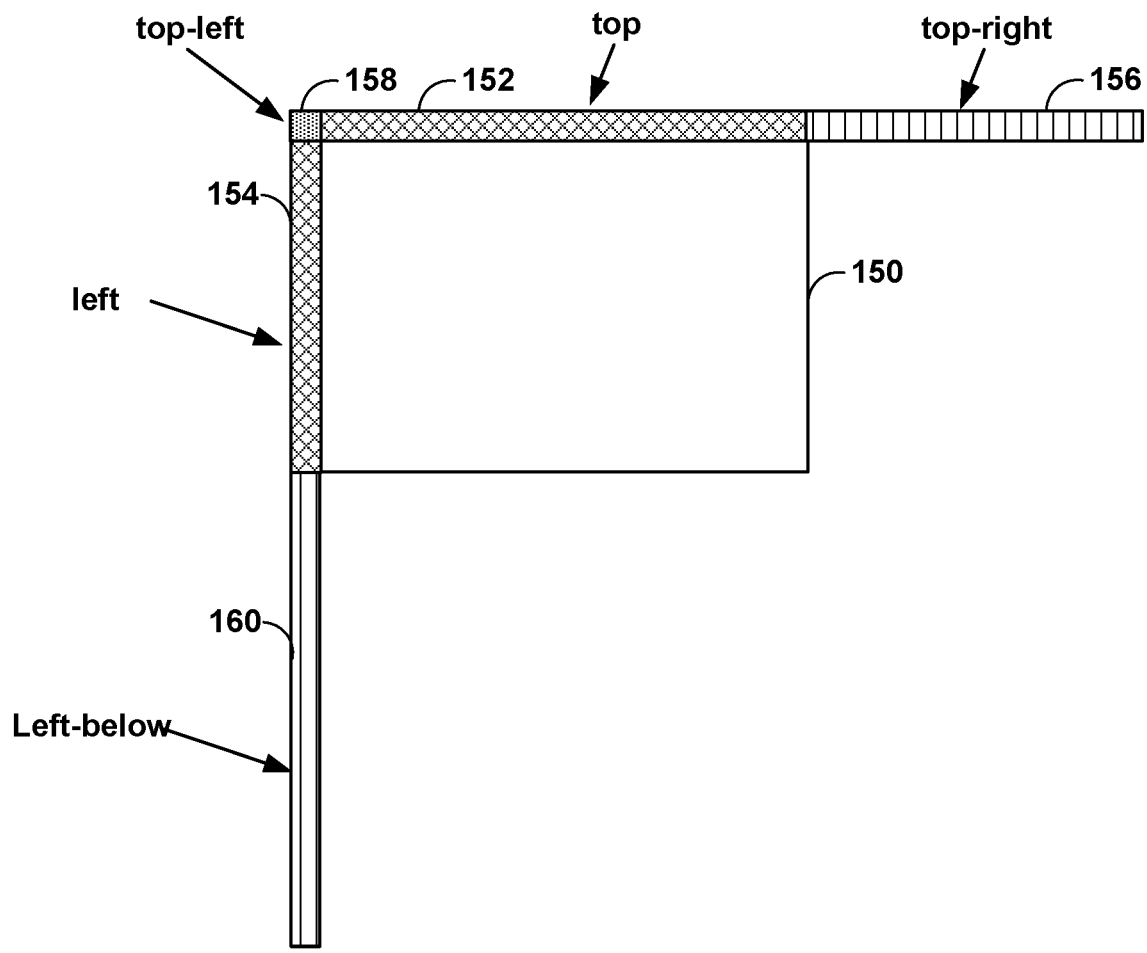
FIG. 4 is a conceptual diagram illustrating an example reference sample array for intra-prediction of chroma components.

FIG. 4 is a conceptual diagram illustrating a reference sample array for intra-prediction of chroma components. A video coder (e.g., video encoder 200 or video decoder 300) may use the samples in a neighbourhood of a coding block 640 for intra prediction of the block. Typically, the video coder uses the reconstructed reference sample lines that are closest to the left and the top boundaries of coding block 150 as the reference samples for intra prediction. For example, the video coder may use reconstruction samples of a top line 152 and/or a left line 154. However, VVC also enables other samples in the neighbourhood of coding block 150 to be used as reference samples (e.g., top-left, left-below, top-right). For example, the video coder may use reconstruction samples of a top-left pixel 158, a left-below line 160, and/or a top-right line 156.

In VVC, a video coder (e.g., video encoder 200 or video decoder 300) may use only reference lines with MRLIdx equal to 0, 1 and 3 for the luma component. For the chroma component, the video coder may use only the reference line with MRLIdx equal to 0 as depicted in FIG. 4. The video coder may code the index to the reference line used for coding the block (values 0, 1 and 2 indicating lines with MRLIdx 0, 1 and 3, respectively) with a truncated unary codeword. The video coder may not use planar and DC modes for the reference line with MRLIdx>0. In some examples, the video coder may add only the available samples of the neighbourhood of a coding block to the reference array for intra-prediction.

In order to increase the processing throughput of intra coding, several methods have been proposed. In Z.-Y. Lin, T.-D. Chuang, C.-Y. Chen, Y.-W. Huang, S.-M. Lei, "CE3-related: Shared reference samples for multiple chroma intra CBs", JVET-M0169 and T. Zhou, T. Ikai, "Non-CE3: Intra chroma partitioning and prediction restriction", JVET-M0065, the small block sizes, e.g., 2×2, 2×4, and 4×2 are disabled in dual tree. For single tree, it is proposed to share reference samples for small blocks (JVET-M0169).

In some hardware video encoders and video decoders, processing throughput is reduced when a picture has more small blocks. Such processing throughput drop may be caused by a use of small intra blocks, because small inter blocks can be processed in parallel while intra blocks have data dependency between neighbouring blocks (e.g., the predictor generation of an intra block requires top and left boundary reconstructed samples from neighbouring blocks) and must be processed sequentially.

In HEVC, the worst-case processing throughput occurs when 4×4 chroma intra blocks are processed. In VVC, the size of the smallest chroma intra block is 2×2, and the reconstruction process of a chroma intra block may become complex due to the adoption of new tools.

Several techniques to increase the worst-case throughput have been proposed in "RECONSTRUCTION OF BLOCKS OF VIDEO DATA USING BLOCK SIZE RESTRICTION," U.S. patent application Ser. No. 16/813,508, filed on Mar. 9, 2020, "ENABLING PARALLEL RECONSTRUCTION OF INTRA-CODED BLOCKS," U.S. Provisional Pat. Ser. No. 62/817,457, filed on Mar. 12, 2019 and "ENABLING PARALLEL RECONSTRUCTION OF INTRA-CODED BLOCKS," U.S. Provisional Pat. Ser. No. 62/824,688, filed on Mar. 27, 2019, each of which is incorporated by reference. In these patent applications, there are generally three main approaches including removal of intra prediction dependency, intra prediction mode restriction, and restriction for chroma split that leads to small blocks. Particularly, for chroma split restriction in shared-tree configuration, the chroma block may be not split while the corresponding luma block area is split.

In VVC, the picture width and height in luma are restricted to be a multiple of the minimum coding unit size while the minimum luma coding unisize may be 4.

pic_width_in_luma_samples specifies the width of each decoded picture in units of luma samples. pic_width_in_luma_samples shall not be equal to 0 and shall be an integer multiple of MinCbSizeY.
  pic_height_in_luma_samples specifies the height of each decoded picture in units of luma samples. pic_height_in_luma_samples shall not be equal to 0 and shall be an integer multiple of MinCbSizeY.

In such a scenario, 4×4 or 4×8 or 8×4 luma area may occur in the corner of the picture. In other words, this case may have 2×2 or 2×4 or 4×2 chroma blocks at the bottom-right corner of the picture.

This disclosure proposes techniques extending the chroma split restriction in shared-tree configuration to enable processing of small intra-coded blocks in parallel and thus increase the processing throughput. In addition, several approaches to deal with the 2×2 and 2×4 chroma block at the corner of the picture are also proposed.

This disclosure extends the chroma split restriction in shared-tree configuration proposed in "ENABLING PARALLEL RECONSTRUCTION OF INTRA-CODED BLOCKS," U.S. Provisional Pat. Ser. No. 62/817,457, filed Mar. 12, 2019 and "ENABLING PARALLEL RECONSTRUCTION OF INTRA-CODED BLOCKS" U.S. Provisional Pat. Ser. No. 62/824,688, filed Mar. 27, 2019.

For example, a video coder (e.g., video encoder 200 or video decoder 300) may restrict the mode for the non-split chroma block. That is, in some examples the video coder may be configured to apply a shared tree (also referred to herein as a "single tree"). In this example, a first luma block (e.g., an 8×8 luma block) may be split into second luma blocks (e.g., four 4×4 luma blocks) according to the shared tree. However, a corresponding chroma block (e.g., a 4×4 chroma block) may not be further split due to a chroma split restriction (e.g., a non-split chroma block).

When all the blocks in the corresponding luma area are intra-coded, the video coder may force the chroma block to be intra. For example, a video coder (e.g., video encoder 200 or video decoder 300) may determine that a chroma block was not split due to a chroma split restriction (e.g., a 4×4 chroma block) and that all of the corresponding luma blocks (e.g., four 4×4 luma blocks) are intra coded. In response to determining that the chroma block was not split due to a chroma split restriction and that all of the corresponding luma blocks are intra coded, the video coder may force the chroma block (e.g., a 4×4 chroma block) to be intra coded. In this way, the video coder may reduce a complexity of the video coder.

In some examples, when the corresponding luma area contains both inter and intra (including intra and IBC mode), a video coder (e.g., video encoder 200 or video decoder 300) may be configured to encode the chroma using a default mode. For example, a video coder (e.g., video encoder 200 or video decoder 300) may determine that a chroma block was not split due to a chroma split restriction (e.g., a 4×4 chroma block) and that all of the corresponding luma blocks (e.g., four 4×4 luma blocks) are intra coded. In response to determining that the chroma block was not split due to a chroma split restriction and that all of the corresponding luma blocks are intra coded, the video coder may force the chroma block (e.g., a 4×4 chroma block) to be coded in a default mode. For example, the default mode may be intra coded. In some examples, the default mode can be inter coded. In this example, the motion vector of the chroma block may be the motion vector of a luma inter block, or the average motion vector of luma inter blocks. When using the default mode, a video encoder (e.g, video encoder 200) may not signal an indication of the default mode and a video decoder (e.g, video decoder 300) may use configuration data to infer a coding mode as being the default mode.

A video coder (e.g., video encoder 200 or video decoder 300) may restrict the picture size to avoid 2×2 and 2×4/4×2 chroma block at the corner of the picture. That is, the video coder may be configured to determine that a chroma block at a bottom-right corner of the picture comprises a size of at least 4×4. In some examples, the video coder may be configured to determine that a luma block at a bottom-right corner of the picture comprises a size of at least 64 pixels.

For example, the block width and height of the picture may be a multiple of maximum of 8 and the minimum CU size. For instance, video encoder 200 may be configured to calculate a width of a picture as $X_1*N$, where $X_1$ is a first integer multiple, $N=\max(8, \text{minCuSize})$, and minCuSize is a minimum coding unit value. The video encoder may be configured to calculate a height of a picture as $X_2*N$, where $X_2$ is a second integer multiple. That is, if 8 is greater than the minCuSize, then the picture width is restricted to being $X_1*8$ and the picture height is restricted to being $X_2*8$. However, if minCuSize is greater than 8, then the picture width is restricted to being $X_1*$minCuSize and the picture height is restricted to being $X_2*$minCuSize.

That is, a video encoder (e.g., video encoder 200) may be configured to apply a picture size restriction to set a width of the picture and a height of the picture to each be a respective multiple of a maximum of 8 and a minimum coding unit size for the picture (e.g., MinCbSizeY). The minimum coding size for the picture may comprise a minimum width of a coding unit for the picture or a minimum height of the coding unit for the picture. A video decoder (e.g., video decoder 300) may be configured to determine a picture size of a picture, wherein the picture size applies a picture size restriction to set a width of the picture and a height of the picture to each be a respective multiple of a maximum of 8 and a minimum coding unit size for the picture. While the foregoing example refers to a picture, the picture may include one or more slices that each include one or more blocks. That is, a block of a picture may be included in a slice of the picture.

The corresponding text regarding the picture width and height in VVC WD may be modified as:

pic_width_in_luma_samples specifies the width of each decoded picture in units of luma samples. pic_width_in_luma_samples shall not be equal to 0 and shall be an integer multiple of the maximum of 8 and MinCbSizeY.

pic_height_in_luma_samples specifies the height of each decoded picture in units of luma samples. pic_height_in_luma_samples shall not be equal to 0 and shall be an integer multiple of the maximum of 8 and MinCbSizeY.

where MinCbSizeY specifies a minimum width of a coding unit for the picture and/or a minimum height of the coding unit for the picture.

That is, a video encoder (e.g., video encoder 200) may be configured to set a width of the picture to comprise a first number of luma samples (e.g., pic_width_in_luma_samples) that is a first multiple of the maximum of 8 and the minimum coding unit size for the picture. In some examples, the video encoder may be configured to set the height of the picture (e.g., pic_height_in_luma_samples) to comprise a second number of luma samples that is a second multiple of the maximum of 8 and the minimum coding unit size for the picture. It should be understood that the values of pic_width_in_luma_samples and pic_height_in_luma_samples may be the same or may be different. The video encoder may signal syntax elements indicating a value for pic_width_in_luma_samples and/or pic_height_in_luma_samples. Techniques described herein may reduce a number of possible values (e.g., prevent values of less than 8), thus potentially reduce a size of a bitstream with little to no loss in prediction accuracy and/or complexity.

A video decoder (e.g., video decoder 300) may be configured to determine a picture size. For example, a picture size may apply a picture size restriction to set the width of the picture to comprise a first number of luma samples that is a first multiple of the maximum of 8 and the minimum coding unit size for the picture. For instance, the video decode may decode values for syntax elements indicating pic_width_in_luma_samples to determine a width of a picture. In some examples, a picture size may apply the picture size restriction to set the height of the picture to comprise a second number of luma samples that is a second multiple of the maximum of 8 and the minimum coding unit size for the picture. For instance, the video decode may decode values for syntax elements indicating pic_height_in_luma_samples to determine a height of a picture.

After partitioning the video data, a video coder (e.g., video encoder 200 or video decoder 300) may generate prediction information for a block and determine a prediction block for the block based on the predicted information. Again, a prediction block may be dependent on neighboring blocks. For example, the video coder may determine a prediction block for a current block based on a top neighboring block and a left neighboring block. By preventing block splits (e.g., chroma components and/or luma components) that lead to relatively small block sizes, the video coder may determine the prediction information of blocks of video data with fewer block dependencies, thus potentially increasing a number of blocks that may be coded (e.g., encoded or decoded) in parallel with little to no loss in prediction accuracy and/or complexity.

A video coder (e.g., video encoder 200 or video decoder 300) may not code (e.g., encode or decode) the 2×2 and 2×4/4×2 blocks at the corner. In order to reconstruct these blocks, the video coder may apply a padding approach. In some examples, the video coder may reconstruct the block using the reconstructed pixel of the above-left pixel of the current block. In some examples of padding, the video coder may reconstruct the block by, for example, repeating the neighbor reconstructed left column. In some examples of padding, the video coder may reconstruct the block by, for example, repeating the neighbor reconstructed above line.

A video coder (e.g., video encoder 200 or video decoder 300) may extend the 2×2 and 2×4/4×2 blocks located at the bottom-right picture corner to size 4×4 samples by padding the 2×2 and 2×4/4×2 blocks. The padded region may contain zeroes or another appropriate constant value (e.g., half of the maximum sample value such as 512 for 10-bit samples) or repeating or mirroring the block samples, etc. For example, the video coder may pad the 2×2 and 2×4/4×2 blocks with a padded region that may contain zeroes or another appropriate constant value (e.g., half of the maximum sample value such as 512 for 10-bit samples) or repeating or mirroring the block samples, etc.

A video coder (e.g., video encoder 200 or video decoder 300) may code (e.g., encode or decode) the resulting 4×4 block like other 4×4 blocks. The video coder may be configured to crop, after reconstructing the 4×4 block, to the block's original 2×2 or 2×4/4×2 size in the picture corner.

A video coder (e.g., video encoder 200 or video decoder 300) may extend the block size of 2×2 and 2×4/4×2 blocks at the corner to be 4×4. In this case, the video coder may set the residual of the extended area equal to a default value (e.g., 0). The transform and quantization of the extended 4×4 may be remained unchanged compared to the encoding of a 4×4 block. In the reconstructed process of the block size of 2×2 and 2×4/4×2 blocks at the corner, the video coder may be configured to not use the prediction value at the extended area while the prediction values that are not extended are used.

Figure 5:
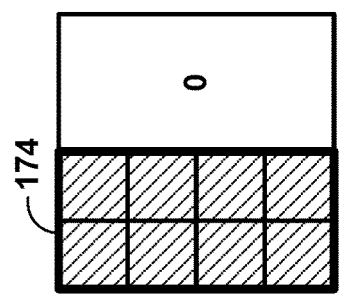
FIG. 5 is a conceptual diagram illustrating an example of extending a 2×2 block to a 4×4 block, extending a 2×4 block to a 4×4 block, and extending a 4×2 block to a 4×4 block.
Figure 5:
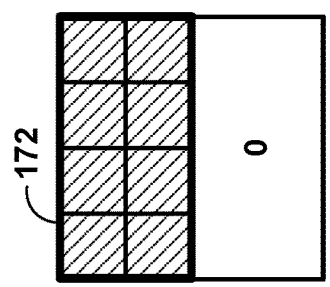
Figure 5:
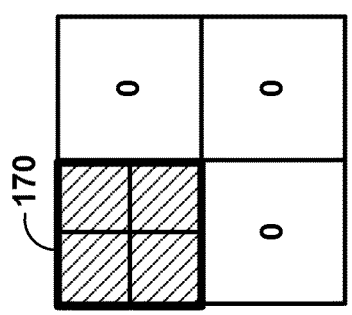

FIG. 5 is a conceptual diagram illustrating an example of extending a 2×2 block 170 to a 4×4 block, extending a 2×4 block 172 to a 4×4 block, and extending a 4×2 block 174 to a 4×4 block. The gray shaped blocks of FIG. 5 may represent actual data while the white area of FIG. 5 may represent extended area.

Figure 6:
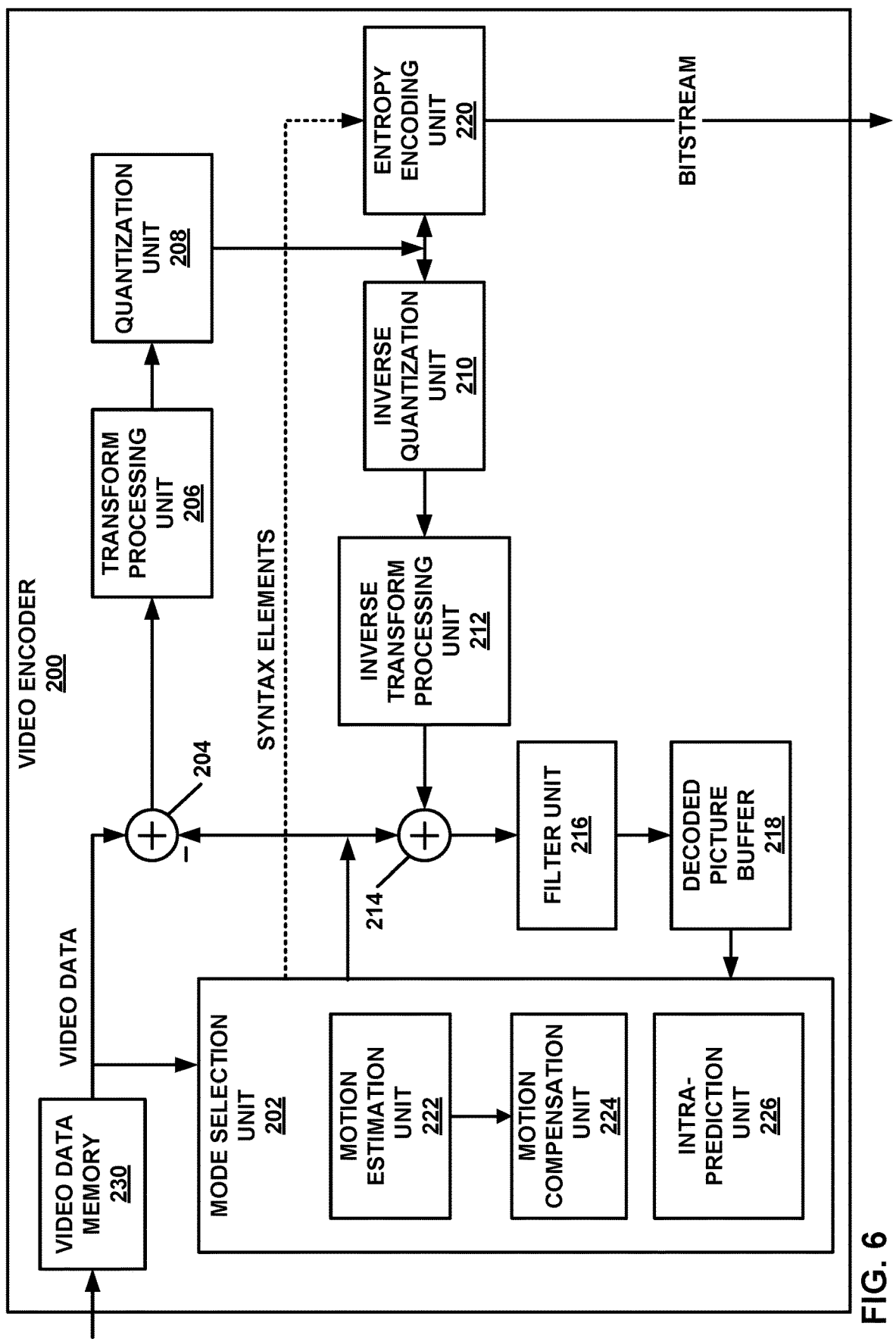
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block." In some examples, mode selection unit 202 may be configured to determine a plurality of sub-blocks of a non-split chroma block of video data based on a chroma-split restriction and process the plurality of sub-blocks to generate prediction information for the non-split chroma block. In some examples, mode selection unit 202 may be configured to restrict a picture size to avoid 2×2 and 2×4/4×2 chroma blocks at a corner of the picture. In some examples, mode selection unit 202 may be configured to refrain from processing 2×2 and 2×4/4×2 blocks at a corner of the picture.

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

Mode selection unit 202 may restrict a picture size. For example, mode selection unit 202 may be configured to set a width of the picture and a height of the picture to each be a respective multiple of a maximum of 8 and a minimum coding unit size for the picture. In this way, mode selection unit 202 may account for subsampling of the chroma components of a block, which may reduce a coding complexity with little or no loss in coding accuracy. For instance, mode selection unit 202 may restrict the picture size to prevent a split of chroma components of a block partition into a relatively small chroma block (e.g., a 2×2 chroma block, a 2×4 chroma block, or a 4×2 chroma block). Restricting the picture size may help to reduce a coding complexity from block dependencies while having no or little impact on coding accuracy.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured determine a plurality of sub-blocks of a non-split chroma block of video data based on a chroma-split restriction and encode the plurality of sub-blocks to generate prediction information for the non-split chroma block. In some examples, video encoder 200 may be configured to restrict a picture size to avoid 2×2 and 2×4/4×2 chroma blocks at a corner of the picture. In some examples, video encoder 200 and video decoder 300 may be configured to refrain from processing 2×2 and 2×4/4×2 blocks at a corner of the picture.

Video encoder 200 represents an example of an apparatus configured to encode video data including a memory (e.g., video data memory 230) configured to store video data, and one or more processors implemented in circuitry. Mode selection unit 202 may be configured to restrict a picture size of video data. To restrict the picture size of the video data, mode selection unit 202 may be configured to set a width of the picture and a height of the picture to each be a respective multiple of a maximum of 8 and a minimum coding unit size for the picture. Mode selection unit 202 may be configured to determine a prediction block for a block of the picture. Residual generation unit 204 may be configured to generate a residual block for the block based on differences between the block and the prediction block. Entropy encoding unit 220 may encode the residual block.

Figure 7:
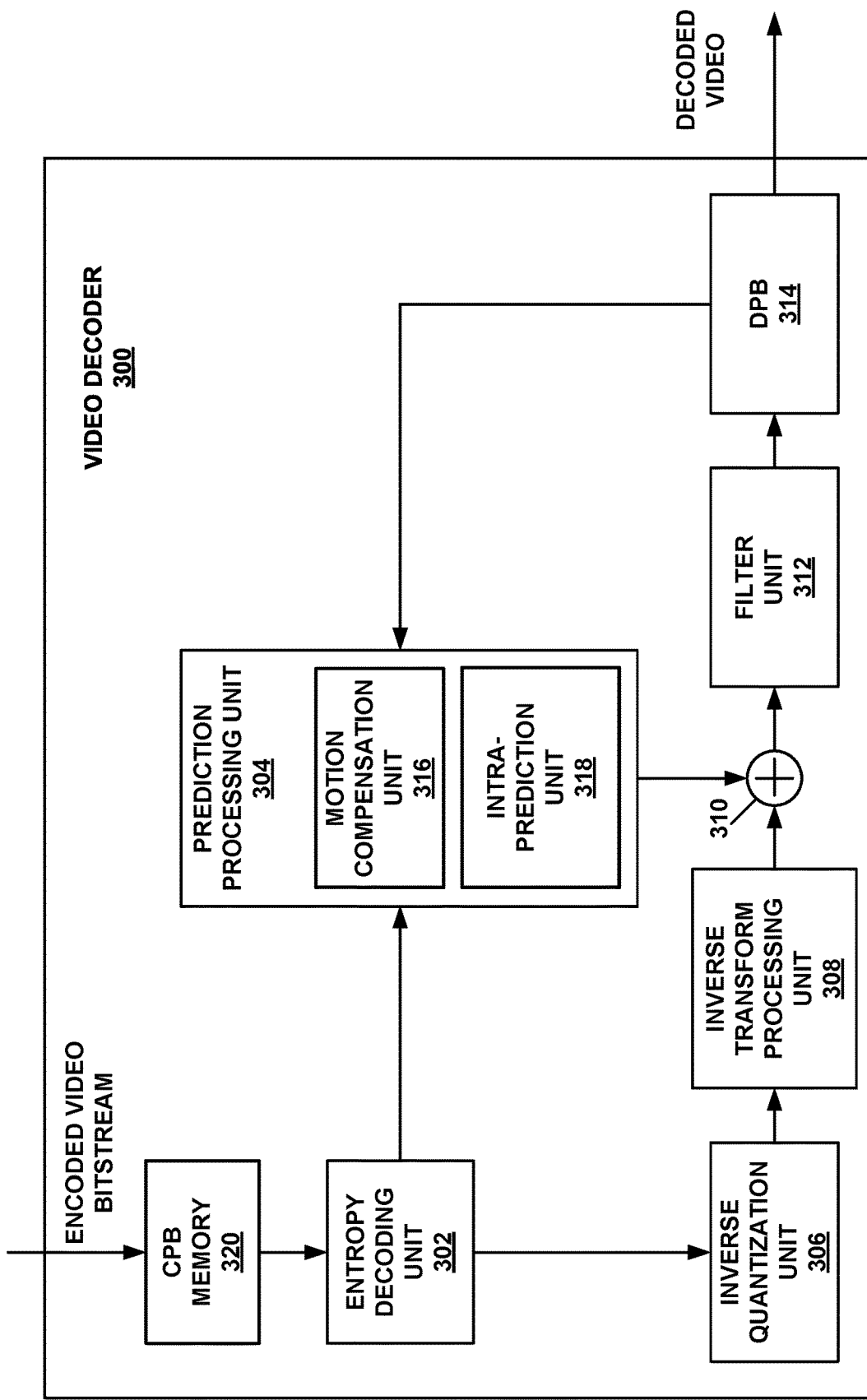
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components. In some examples, prediction processing unit 304 may be configured to determine a plurality of sub-blocks of a non-split chroma block of video data based on a chroma-split restriction and process the plurality of sub-blocks to generate prediction information for the non-split chroma block. In some examples, prediction processing unit 304 may be configured to restrict a picture size to avoid 2×2 and 2×4/4×2 chroma blocks at a corner of the picture. In some examples, prediction processing unit 304 may be configured to refrain from processing 2×2 and 2×4/4×2 blocks at a corner of the picture.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Prediction processing unit 304 may determine a picture size restriction. For example, the picture size restriction may comprise setting a width of the picture and a height of the picture to each be a respective multiple of a maximum of 8 and a minimum coding unit size for the picture. In this way, prediction processing unit 304 may account for subsampling of the chroma components of a block, which may reduce a coding complexity with little or no loss in coding accuracy. For instance, prediction processing unit 304 may apply a picture size restriction that prevents a split of chroma components of a block partition into a relatively small chroma block (e.g., a 2×2 chroma block, a 2×4 chroma block, or a 4×2 chroma block). Applying the picture size restriction may help to reduce a coding complexity from block dependencies while having no or little impact on coding accuracy.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of an apparatus including a memory (e.g., video data memory 230) configured to store video data, and one or more processing units implemented in circuitry and configured to determine a picture size restriction. The picture size restriction may comprise setting a width of the picture and a height of the picture to each be a respective multiple of a maximum of 8 and a minimum coding unit size for the picture. Mode selection unit 202 may be configured to determine a prediction block for a block of the picture. Residual generation unit 204 may be configured to generate a residual block for the block based on differences between the block and the prediction block. Entropy encoding unit 220 may encode the residual block. Prediction processing unit 304 may be configured to determine a prediction block for a block of the picture. Entropy decoding unit 302 may be configured to decode a residual block for the block. Reconstruction unit 310 may be configured to combine the prediction block and the residual block to decode the block.

Figure 8:
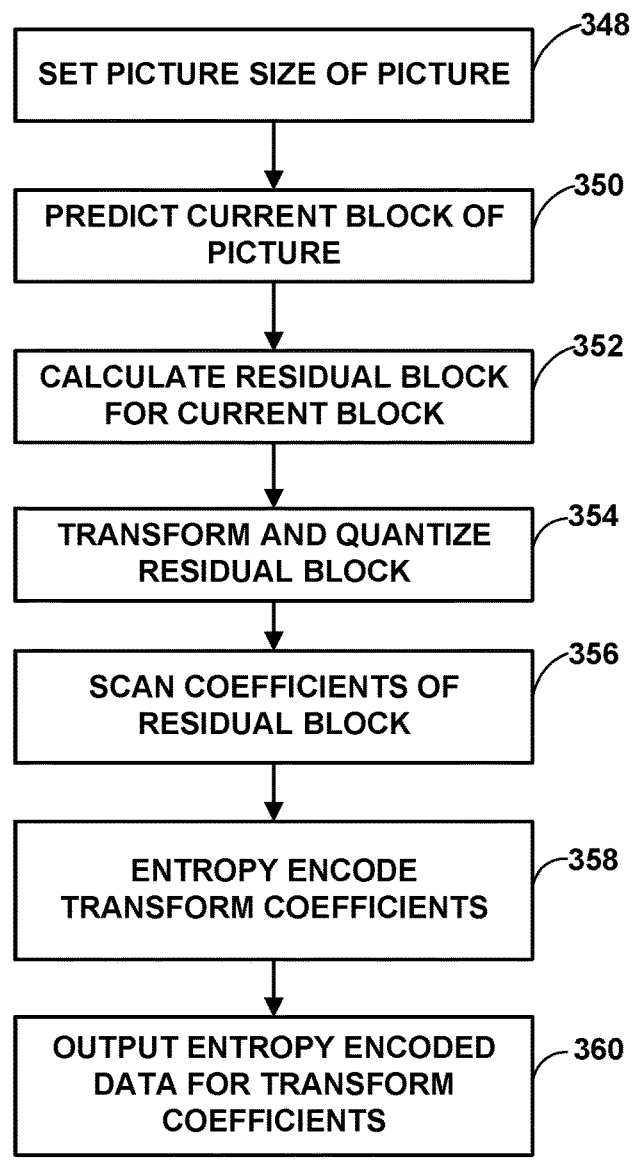
FIG. 8 is a flowchart illustrating an example method for encoding a current block

FIG. 8 is a flowchart illustrating an example method for encoding a current block. The current block may comprise a current CU. Although described with respect to video encoder 200 (FIGS. 1 and 6), other devices may be configured to perform a method similar to that of FIG. 8.

Mode selection unit 202 may set a picture size of a picture (348). For example, mode selection unit 202 may apply a picture size restriction to set a width of the picture and a height of the picture to each be a respective multiple of a maximum of 8 and a minimum coding unit size for the picture. By preventing splits that lead to relatively small picture block sizes, mode selection unit 202 may determine prediction blocks for blocks of a picture (e.g., a video picture, slice, or another portion) of video data with fewer block dependencies, thus potentially increasing a number of blocks that may be coded (e.g., encoded or decoded) in parallel with little to no loss in prediction accuracy and/or complexity.

Mode selection unit 202 may predict the current block (350). Mode selection unit 202 may restrict a partitioning of a picture. For instance, mode selection unit 202 may set a width of the picture and a height of the picture to each be a respective multiple of a maximum of 8 and a minimum coding unit size for the picture, which may help to prevent a splitting of a block that would result in a small block chroma block at a corner of the picture.

For example, mode selection unit 202 may form a prediction block for the current block. Residual generation unit 204 may then calculate a residual block for the current block (352). To calculate the residual block, residual generation unit 204 may calculate a difference between the original, unencoded block and the prediction block for the current block. Transform processing unit 206 and quantization unit 208 may then transform and quantize coefficients of the residual block (354). Entropy encoding unit 220 may scan the quantized transform coefficients of the residual block (356). During the scan, or following the scan, entropy encoding unit 220 may entropy encode the transform coefficients (358). For example, entropy encoding unit 220 may encode the transform coefficients using CAVLC or CABAC. Entropy encoding unit 220 may output the entropy encoded data of the block (360).

Figure 9:
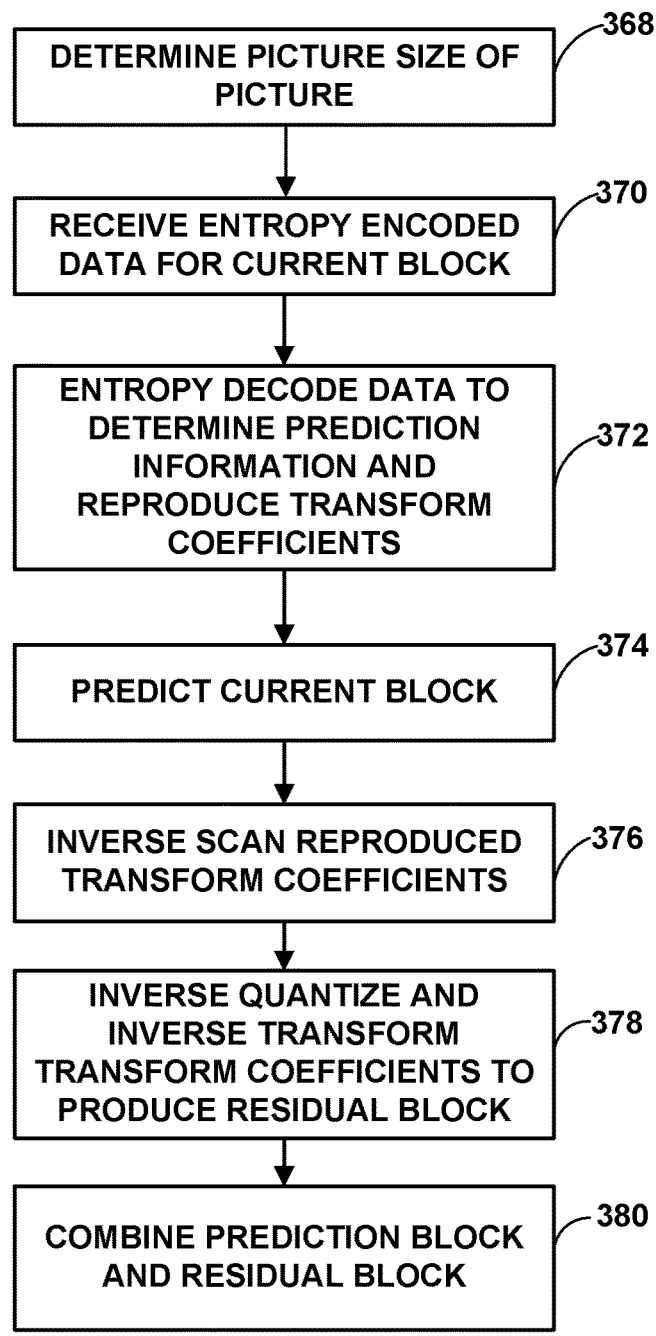
FIG. 9 is a flowchart illustrating an example method for decoding a current block of video data.

FIG. 9 is a flowchart illustrating an example method for decoding a current block of video data. The current block may comprise a current CU. Although described with respect to video decoder 300 (FIGS. 1 and 7), other devices may be configured to perform a method similar to that of FIG. 9.

Prediction processing unit 304 may determine a picture size of a picture (368). For example, prediction processing unit 304 may determine a picture size that applies a picture size restriction to set a width of the picture and a height of the picture to each be a respective multiple of a maximum of 8 and a minimum coding unit size for the picture. Configuring prediction processing unit 304 to determine the picture size that applies the picture size restriction may help to prevent splits that lead to relatively small block sizes. Preventing splits that lead to relatively small block sizes may help to determine prediction blocks for blocks of a picture (e.g., a video picture, slice, or another portion) of video data with fewer block dependencies, thus potentially increasing a number of blocks that may be coded (e.g., encoded or decoded) in parallel with little to no loss in prediction accuracy and/or complexity.

Entropy decoding unit 302 may receive entropy coded data for the current block, such as entropy coded prediction information and entropy encoded data for coefficients of a residual block corresponding to the current block (370). Entropy decoding unit 302 may entropy decode the entropy coded data to determine prediction information for the current block and to reproduce coefficients of the residual block (372). Prediction processing unit 304 may predict the current block (374), e.g., using an intra- or inter-prediction mode as indicated by the prediction information for the current block, to calculate a prediction block for the current block. Prediction processing unit 304 may determine a partitioning of video data using a picture size restriction. The picture size restriction may comprise setting a width of the picture and a height of the picture to each be a respective multiple of a maximum of 8 and a minimum coding unit size for the picture. For example, prediction processing unit 304 may apply a picture size restriction to determine a partition that prevents a splitting of a block that would result in a small block chroma block at a corner of the picture.

Entropy decoding unit 302 may then inverse scan the reproduced coefficients (376), to create a block of quantized transform coefficients. Inverse quantization unit 306 and inverse transform processing unit 308 may inverse quantize and inverse transform the transform coefficients to produce a residual block (378). Reconstruction unit 310 may decode the current block by combining the prediction block and the residual block (380).

Figure 10:
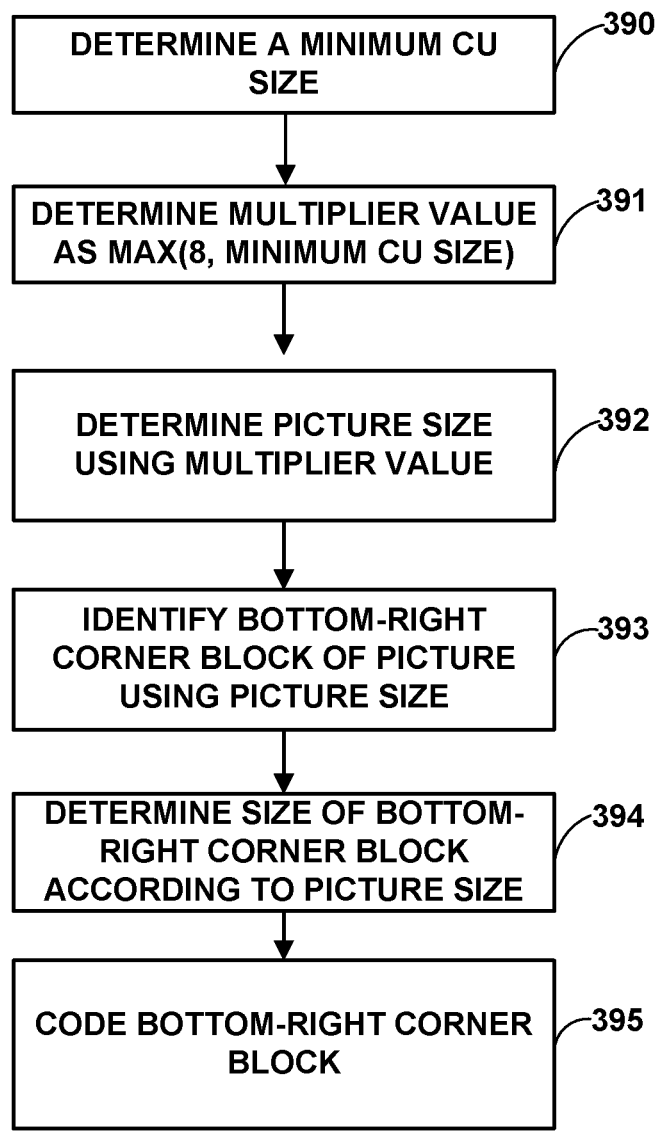
FIG. 10 is a flowchart illustrating an example process using a picture size restriction, in accordance with the techniques of the disclosure.

FIG. 10 is a flowchart illustrating an example process using a picture size restriction, in accordance with the techniques of the disclosure. The current block may comprise a current CU. Although described with respect to video decoder 300 (FIGS. 1 and 7), other devices may be configured to perform a method similar to that of FIG. 9.

A video coder (e.g., video encoder 200 or video decoder 300, or more particularly, for example, mode selection unit 202 of video encoder 200 or prediction processing unit 304 of video decoder 300) may determine a minimum CU size (390). For example, the video coder may determine MinCbSizeY. The video coder may determine a multiplier value as a max(8, minCuSize) (391). For example, the video coder may determine the multiplier value as 8 if 8 is greater than the minCuSize and may determine th multiplier value as minCuSize if minCuSize is greater than 8.

The video coder may determine a picture size using a multiplier value (392). For example, the video coder may determine a width for the picture as a result of an integer (e.g., $X_1$) and the multiplier value (e.g., the max(8, minCuSize)) and determine a height for the picture as a result of an integer (e.g., $X_2$) and the multiplier value (e.g., the max(8, minCuSize)).

The video coder may identify a bottom-right corner block of the picture using the picture size (393). For example, the video coder may determine a partition (e.g., partition or decode one or more syntax values indicating a partition) that splits, based on the picture size, the picture into an integer number of blocks that includes a corner bottom-right corner block of the picture.

The video coder may determine a size of the bottom-right corner block according to the picture size (394). For example, the video coder may determine a partition (e.g., partition or decode one or more syntax values indicating a partition) that sets, based on the picture size, the bottom-right corner block to comprise a width of at least 8 samples and a height of at least 8 samples.

The video coder may code (e.g., encode or decode the bottom-right corner block (395). For example, the video coder may generate a prediction block for the bottom-right corner block. In examples where the video coder is a video encoder, the video encoder may generate a residual block for the bottom-right corner block. In this example, the video encoder may generate a residual block for the bottom-right corner block based on differences between the bottom-right corner block and the prediction bottom-right corner block and encode the residual block. In examples where the video coder is a video decoder, the video decoder may generate a prediction block for the bottom-right corner block. In this example, the video decode may decode a residual block for the bottom-right corner block and combine the prediction block and the residual block to decode the bottom-right corner block.

In the example of FIG. 10, a video coder (e.g., video encoder 200 or video decoder 300) may perform encoding and/or decoding of the bottom-right corner of the picture, which may comprise at least 64 luma samples. In some examples, a video coder (e.g., video encoder 200 or video decoder 300) may encode and/or decode the bottom-right corner blocks using a local dual tree scheme, in which a luma block for the bottom-right corner of the picture can be split into luma sub-blocks (e.g., one 8×8 block may be split into two 4×8 blocks). The video coder may encode and/or decode all the luma sub-blocks using the same mode inter. In some examples, the video coder may encode and/or decode the luma sub-blocks using intra mode, intra block copy (IBC), and/or palette mode.

In response to determining to encode or decode all the luma sub-blocks using inter mode, the video coder (e.g., video encoder 200 or video decoder 300) may split a chroma block for the bottom-right corner of the picture into chroma sub-blocks as the luma block is split and inherit motion information from the luma block to encode and/or decode the chroma sub-blocks. In response, however, to determining to encode or decode the luma sub-blocks using intra mode, intra block copy (IBC), and/or palette mode, the video coder may not split the chroma block and the video coder may encode and/or decode the chroma block using intra prediction.

A non-limiting illustrative list of examples of the techniques of this disclosure is provided below.

Example 1. A method of processing video data, the method comprising: determining, by a video coder, a plurality of sub-blocks of a non-split chroma block of an inter-coded slice of video data based on a chroma-split restriction; and processing, by a video coder, the plurality of sub-blocks to generate prediction information for the non-split chroma block.

Example 2. The method of example 1, comprising: forcing each of the plurality of sub-blocks to be intra coded when all blocks in a corresponding luma area are intra-coded.

Example 3. The method of any of examples 1-2, comprising: coding each of the sub-blocks using a default mode when a corresponding luma area contains both inter- and intra-coded luma blocks.

Example 4. The method of example 3, wherein the default mode comprises intra mode.

Example 5. The method of example 3, wherein the default mode comprises inter mode.

Example 6. The method of example 5, further comprising determining a motion vector for one or more of the plurality of sub-blocks according to a motion vector for one of the inter-coded luma blocks of the corresponding luma area.

Example 7. The method of example 5, further comprising determining a motion vector for one or more of the plurality of sub-blocks according to an average of motion vectors for each of the inter-coded luma blocks of the corresponding luma area.

Example 8. A method of processing video data, the method comprising: restricting a picture size to avoid 2×2 and 2×4/4×2 chroma blocks at a corner of the picture; determining, by a video coder, a plurality of blocks of the picture of video data; and processing, by a video coder, the plurality of blocks.

Example 9. The method of example 8, wherein restricting the picture size comprises setting a width of the picture and a height of the picture to be a multiple of maximum 8 and a minimum CU size.

Example 10. A method of processing video data, the method comprising: determining, by a video coder, a plurality of blocks of the picture of video data; and processing, by a video coder, the plurality of blocks, wherein processing the plurality of blocks comprises refraining from processing 2×2 and 2×4/4×2 blocks at a corner of the picture.

Example 11. The method of processing video data of example 10, wherein refraining from processing 2×2 and 2×4/4×2 blocks at a corner of the picture comprises reconstructing the 2×2 and 2×4/4×2 blocks at the corner of the picture.

Example 12. The method of processing video data of example 10, wherein refraining from processing 2×2 and 2×4/4×2 blocks at a corner of the picture comprises extending 2×2 and 2×4/4×2 blocks located at the bottom-right picture corner to size 4×4 samples by padding the 2×2 and 2×4/4×2 blocks.

Example 13. The method of processing video data of example 10, wherein refraining from processing 2×2 and 2×4/4×2 blocks at a corner of the picture comprises extending the block size of 2×2 and 2×4/4×2 blocks at the corner to be 4×4 and setting a residual of the extended area to a default value.

Example 14. A device for coding video data, the device comprising one or more means for performing the method of any of examples 1-13.

Example 15. The device of example 14, wherein the one or more means comprise one or more processors implemented in circuitry.

Example 16. The device of any of examples 14 and 15, further comprising a memory to store the video data.

Example 17. The device of any of examples 14-16, further comprising a display configured to display decoded video data.

Example 18. The device of any of examples 14-17, wherein the device comprises one or more of a camera, a computer, a mobile device, a broadcast receiver device, or a set-top box.

Example 19. The device of any of examples 14-18, wherein the device comprises a video decoder.

Example 20. The device of any of examples 14-19, wherein the device comprises a video encoder.

Example 21. A computer-readable storage medium having stored thereon instructions that, when executed, cause one or more processors to perform the method of any of examples 1-13.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining, by one or more processors implemented in circuitry, a picture size of a picture according to a picture size restriction, wherein the picture size restriction comprises determining a maximum between a minimum coding unit size for the picture and 8 and determining a width of the picture and a height of the picture to each be a respective multiple of the determined maximum;
    determining, by the one or more processors, a partition of the picture into a plurality of blocks;
    generating, by the one or more processors, a prediction block for a block of the plurality of blocks;
    decoding, by the one or more processors, a residual block for the block; and
    combining, by the one or more processors, the prediction block and the residual block to decode the block.

2. The method of claim 1, wherein the minimum coding unit size comprises a minimum width of a coding unit for the picture or a minimum height of the coding unit for the picture.

3. The method of claim 1, wherein determining the partition comprises determining that a chroma block at a bottom-right corner of the picture comprises a size of at least 4×4.

4. The method of claim 1, wherein determining the partition comprises determining that a luma block at a bottom-right corner of the picture comprises a size of at least 8×8.

5. The method of claim 1,
    wherein the picture size applies the picture size restriction to set the width of the picture to comprise a first number of luma samples that is a first multiple of the maximum of 8 and the minimum coding unit size for the picture; and
    wherein the picture size applies the picture size restriction to set the height of the picture to comprise a second number of luma samples that is a second multiple of the maximum of 8 and the minimum coding unit size for the picture.

6. The method of claim 1, wherein the block is included in a slice of the picture.

7. A method of encoding video data, the method comprising:
    setting, by one or more processors implemented in circuitry, a picture size of a picture, wherein setting the picture size comprises determining a maximum between a minimum coding unit size for the picture and 8 and applying a picture size restriction to set a width of the picture and a height of the picture to each be a respective multiple of the determined maximum;
    partitioning, by one or more processors implemented in circuitry, the picture into a plurality of blocks;
    generating, by the one or more processors, a prediction block for a block of the plurality of blocks;
    generating, by the one or more processors, a residual block for the block based on differences between the block and the prediction block; and
    encoding, by the one or more processors, the residual block.

8. The method of claim 7, wherein the minimum coding unit size comprises a minimum width of a coding unit for the picture or a minimum height of the coding unit for the picture.

9. The method of claim 7, wherein partitioning comprises determining that a chroma block at a bottom-right corner of the picture comprises a size of at least 4×4.

10. The method of claim 7, wherein partitioning comprises determining that a luma block at a bottom-right corner of the picture comprises a size of at least 8×8.

11. The method of claim 7, wherein setting the picture size comprises:
    setting the width of the picture to comprise a first number of luma samples that is a first multiple of the maximum of 8 and the minimum coding unit size for the picture; and
    setting the height of the picture to comprise a second number of luma samples that is a second multiple of the maximum of 8 and the minimum coding unit size for the picture.

12. The method of claim 7, wherein the block is included in a slice of the picture.

13. A device for decoding video data, the device comprising one or more processors implemented in circuitry and configured to:
    determine a picture size of a picture according to a picture size restriction so as to determine a maximum between a minimum coding unit size for the picture and 8 and determine a width of the picture and a height of the picture to each be a respective multiple of the determined maximum;
    determine a partition of the picture into a plurality of blocks;
    generate a prediction block for a block of the plurality of blocks;
    decode a residual block for the block; and
    combine the prediction block and the residual block to decode the block.

14. The device of claim 13, wherein the minimum coding unit size comprises a minimum width of a coding unit for the picture or a minimum height of the coding unit for the picture.

15. The device of claim 13, wherein, to determine the partition, the one or more processors are configured to determine that a chroma block at a bottom-right corner of the picture comprises a size of at least 4×4.

16. The device of claim 13, wherein, to determine the partition, the one or more processors are configured to determine that a luma block at a bottom-right corner of the picture comprises a size of at least 8×8.

17. The device of claim 13,
    wherein the picture size applies the picture size restriction to set the width of the picture to comprise a first number of luma samples that is a first multiple of the maximum of 8 and the minimum coding unit size for the picture; and
    wherein the picture size applies the picture size restriction to set the height of the picture to comprise a second number of luma samples that is a second multiple of the maximum of 8 and the minimum coding unit size for the picture.

18. The device of claim 13, wherein the block is included in a slice of the picture.

19. The device of claim 13, further comprising a display configured to display the picture.

20. The device of claim 13, wherein the device comprises one or more of a camera, a computer, a mobile device, a broadcast receiver device, or a set-top box.

21. A device for encoding video data, the device comprising one or more processors implemented in circuitry and configured to:

set a picture size of a picture, wherein, to set the picture size, the one or more processors are configured to determine a maximum between a minimum coding unit size for the picture and 8 and apply a picture size restriction to set a width of the picture and a height of the picture to each be a respective multiple of the determined maximum;

partition the picture into a plurality of blocks;

generate a prediction block for a block of the plurality of blocks;

generate a residual block for the block based on differences between the block and the prediction block; and encode the residual block.

22. The device of claim 21, wherein the minimum coding unit size comprises a minimum width of a coding unit for the picture or a minimum height of the coding unit for the picture.

23. The device of claim 21, wherein, to partition, the one or more processors are configured to determine that a chroma block at a bottom-right corner of the picture comprises a size of at least 4×4.

24. The device of claim 21, wherein, to partition, the one or more processors are configured to determine that a luma block at a bottom-right corner of the picture comprises a size of at least 8×8.

25. The device of claim 21, wherein, to set the picture size, the one or more processors are configured to:
set the width of the picture to comprise a first number of luma samples that is a first multiple of the maximum of 8 and the minimum coding unit size for the picture; and
set the height of the picture to comprise a second number of luma samples that is a second multiple of the maximum of 8 and the minimum coding unit size for the picture.

26. The device of claim 21, wherein the block is included in a slice of the picture.

27. An apparatus for decoding video data, the apparatus comprising:
means for determining a picture size of a picture, wherein the picture size applies a picture size restriction, wherein the picture size restriction comprises determining a maximum between a minimum coding unit size for the picture and 8 and determining a width of the picture and a height of the picture to each be a respective multiple of the determined maximum;
means for determining a partition of the picture into a plurality of blocks;
means for generating a prediction block for a block of the plurality of blocks;
means for decoding a residual block for the block; and
means for combining the prediction block and the residual block to decode the block.

28. An apparatus for encoding video data, the apparatus comprising:
means for setting a picture size of a picture, wherein the means for setting the picture size comprises means for determining a maximum between a minimum coding unit size for the picture and 8 and means for applying a picture size restriction to set a width of the picture and a height of the picture to each be a respective multiple of the determined maximum;
means for partitioning the picture into a plurality of blocks;
means for generating a prediction block for a block of the plurality of blocks;
means for generating a residual block for the block based on differences between the block and the prediction block; and
means for encoding the residual block.

29. A non-transitory computer-readable storage medium having stored thereon instructions that, when executed, cause one or more processors to:
determine a picture size of a picture, wherein the picture size applies a picture size restriction so as to determine a maximum between a minimum coding unit size for the picture and 8 and determine a width of the picture and a height of the picture to each be a respective multiple of the determined maximum;
determine a partition of the picture into a plurality of blocks;
generate a prediction block for a block of the plurality of blocks;
decode a residual block for the block; and
combine the prediction block and the residual block to decode the block.

30. A non-transitory computer-readable storage medium having stored thereon instructions that, when executed, cause one or more processors to:
set a picture size of a picture, wherein, to set the picture size, the instructions cause the one or more processors to determine a maximum between a minimum coding unit size for the picture and 8 and apply a picture size restriction to set a width of the picture and a height of the picture to each be a respective multiple of the maximum;
partition the picture into a plurality of blocks;
generate a prediction block for a block of the plurality of blocks;
generate a residual block for the block based on differences between the block and the prediction block; and
encode the residual block.

* * * * *